(12) United States Patent
Ahec et al.

(10) Patent No.: US 12,334,798 B2
(45) Date of Patent: Jun. 17, 2025

(54) INVERTER FOR AN ELECTRIC MOTOR

(71) Applicant: Mahle International GmbH, Stuttgart (DE)

(72) Inventors: Ziga Ahec, Grosuplje (SI); Gregor Babic, Videm-Dobrepolje (SI); Igor Tschemeris, Kornwestheim (DE); Luka Verdev, Velenje (SI); Rok Vrtovec, Sempas (SI)

(73) Assignee: Mahle International GmbH (DE)

( * ) Notice: Subject to any disclaimer, the term of this patent is extended or adjusted under 35 U.S.C. 154(b) by 426 days.

(21) Appl. No.: 17/835,944

(22) Filed: Jun. 8, 2022

(65) Prior Publication Data
US 2022/0399785 A1  Dec. 15, 2022

(51) Int. Cl.
| H02K 11/33 | (2016.01) |
| H02K 5/20 | (2006.01) |
| H02K 9/19 | (2006.01) |
| H02K 11/30 | (2016.01) |
| H02P 27/06 | (2006.01) |

(52) U.S. Cl.
CPC ............. H02K 9/19 (2013.01); H02K 5/203 (2021.01); H02K 11/30 (2016.01); H02P 27/06 (2013.01)

(58) Field of Classification Search
CPC .......... H02K 9/19; H02K 9/197; H02K 11/30; H02K 11/33; H02K 11/0094; H02K 5/203; H02K 5/20; H02K 2203/03; H02P 27/06; H02P 27/05; H02M 7/48; H02M 7/003
See application file for complete search history.

(56) References Cited

U.S. PATENT DOCUMENTS

| 7,641,490 | B2* | 1/2010 | Korich | B60L 3/003 |
| | | | | 439/196 |
| 8,875,825 | B2* | 11/2014 | Asakura | B60K 6/405 |
| | | | | 310/52 |
| 10,888,036 | B1* | 1/2021 | Joshi | H05K 1/0203 |
| 11,044,839 | B2* | 6/2021 | Babic | H02K 11/33 |
| 11,711,003 | B2* | 7/2023 | Abdelli | H02P 27/08 |
| | | | | 318/504 |
| 11,781,565 | B2* | 10/2023 | Fedorikhin | F04D 17/10 |
| | | | | 417/423.14 |
| 2014/0265743 | A1* | 9/2014 | Chamberlin | H02K 9/227 |
| | | | | 310/68 D |
| 2019/0089228 | A1 | 3/2019 | Fukuda et al. | |
| 2020/0352041 | A1 | 11/2020 | Bulovic et al. | |

(Continued)

FOREIGN PATENT DOCUMENTS

| CN | 106458001 A | * | 2/2017 | ............... B60K 1/04 |
| CN | 106911224 A | * | 6/2017 | |
| CN | 106981954 A | * | 7/2017 | |

(Continued)

*Primary Examiner* — Edgardo San Martin
(74) *Attorney, Agent, or Firm* — Fishman Stewart PLLC

(57) ABSTRACT

An inverter for an electric motor is disclosed. The inverter includes a capacitor board including at least one capacitor, at least one transistor board, and a cooling element. The capacitor board and the at least one transistor board are electrically interconnected. The capacitor board and the at least one transistor board are each aligned transversely to a longitudinal central axis of the inverter. The cooling element is pot-shaped and provides a housing of the inverter that receives the capacitor board and the at least one transistor board.

20 Claims, 12 Drawing Sheets

(56) References Cited

U.S. PATENT DOCUMENTS

| | | | |
|---|---|---|---|
| 2022/0399777 A1* | 12/2022 | Ahec | H02K 5/225 |
| 2024/0195316 A1* | 6/2024 | Bachheibl | H02K 9/223 |

FOREIGN PATENT DOCUMENTS

| | | | | |
|---|---|---|---|---|
| CN | 108110959 A | * | 6/2018 | |
| CN | 115606324 A | * | 1/2023 | .......... H02M 1/0009 |
| DE | 102017222822 A1 | * | 6/2019 | |
| EP | 2482428 A2 | | 8/2012 | |
| EP | 3334015 A1 | * | 6/2018 | ............ H02K 11/33 |
| EP | 3634096 A1 | * | 4/2020 | |
| EP | 3944469 B1 | * | 9/2024 | |
| JP | 2014204554 A | | 10/2014 | |
| JP | 2015082951 A | | 4/2015 | |
| JP | 2019057968 A | | 4/2019 | |
| KR | 20170140320 A | * | 12/2017 | |
| WO | WO-2014005373 A1 | * | 1/2014 | ........... H05K 7/1432 |
| WO | WO-2019233727 A1 | * | 12/2019 | |

\* cited by examiner

INVERTER FOR AN ELECTRIC MOTOR

CROSS-REFERENCE TO RELATED APPLICATION

This application claims priority to European Application No. EP 21178428.5 filed on Jun. 9, 2021, the contents of which are hereby incorporated by reference in its entirety.

TECHNICAL FIELD

The invention relates to an inverter for electric motor. The invention also relates to an electric motor comprising such an inverter.

BACKGROUND

An electric motor usually comprises a rotor and a stator, which cooperate electromagnetically with one another. An inverter usually comprises a capacitor board comprising capacitors, a transistor board, and a control board, and converts the direct current into the phase current for the stator. The heat generated during the conversion of the direct current into the phase current has to be discharged to the outside thereof. However, compromises have to be made from time to time due to a small available installation space in the inverter. This can result in that the components of the inverter are not cooled sufficiently and/or the assembly of the inverter is made more difficult.

It is thus the object of the invention to provide an improved or at least alternative embodiment for an inverter of the generic type, which overcomes the described disadvantages. It is also the object of the invention to provide an electric motor comprising the inverter.

SUMMARY

According to the invention, these objects are solved by means of the subject matter of the independent claim(s). Advantageous embodiments are subject matter of the dependent claims.

An inverter is provided for an electric motor. The inverter thereby comprises a capacitor board comprising at least one capacitor, at least one transistor board, and a cooling element. The capacitor board and the at least one transistor board are each aligned transversely to a longitudinal central axis of the inverter and are electrically interconnected. According to the invention, the cooling element is pot-shaped and forms a housing, which receives the capacitor board and the at least one transistor board.

In the inverter according to the invention, the capacitor board and the at least one transistor board are received in the housing or the cooling element, respectively. The capacitor board and the at least one transistor board, as well as optionally further components of the inverter, are thereby supported by the housing or the cooling element, respectively. The capacitor board and the at least one transistor board, as well as optionally further components of the inverter, can thus be arranged in a space-saving manner in the housing or the cooling element, respectively, and can be cooled effectively by means of the housing or the cooling element, respectively. Further components of the inverter can be, for example, a control board, which is then received in the same way in the housing or in the cooling element, respectively.

The inverter according to the invention thereby has the longitudinal central axis and, with respect to its longitudinal central axis, a longitudinal end facing the motor, and a longitudinal end facing away from the motor. The two longitudinal ends are thereby arranged so as to be located opposite one another with respect to the longitudinal central axis. According to the intended purpose, the pot-shaped cooling element is open towards the longitudinal end of the inverter, which faces the motor. The terms "axially" and "radially" thereby always refer to the longitudinal central axis of the inverter.

Advantageously, the cooling element can be cast from aluminum. Advantageously, the inverter can have six transistor boards and can be provided for a six-phase motor. Advantageously, the capacitor board can have several capacitors. Advantageously, the respective capacitor can be material bonded, preferably welded, to the capacitor board at four negative pole contact points and at a positive pole contact point, and can thus be contacted in an electrically conductive manner. Advantageously, it can be provided that the cooling element has at least one cooling duct, through which a cooling liquid can flow.

Advantageously, it can be provided that the cooling element has a bottom, which is aligned transversely to the longitudinal central axis, and a wall, which extends from the perimeter of the bottom and parallel to the longitudinal central axis. In addition, a passage opening for contact lines of the inverter can be formed centrally in the bottom. The bottom of the cooling element can thereby be arranged with the passage opening at the end of the inverter facing away from the motor.

Advantageously, it can be provided that the cooling element has at least one cooling duct, through which a cooling liquid can flow. The at least one cooling duct can thereby be formed in the bottom of the cooling element so as to surround the passage opening. The capacitor board and the at least one transistor board, as well as optionally further components of the inverter, can thus be cooled effectively and actively.

Advantageously, it can be provided that the cooling element has a pot element produced by means of die casting, and a cover plate aligned transversely to the longitudinal central axis. In addition, at least one cooling duct, which is open on one side and which is aligned transversely to the longitudinal central axis, is formed in the pot element on the outer side. The cover plate then axially and sealingly closes the at least one cooling duct, which is formed in the pot element and is open on one side, and the cover plate is material bonded, preferably soldered, or firmly attached, preferably via a gasket, to the pot element. Advantageously, the cooling element can have an inlet nozzle and/or an outlet nozzle. The inlet nozzle and/or the outlet nozzle can be material bonded, preferably soldered, to the pot element. Advantageously, the inlet nozzle and/or the outlet nozzle can be fluidically connected to the at least one cooling duct.

Advantageously, it can be provided that the inverter contains a single transistor board, which is annular and is arranged so as to surround the longitudinal central axis. Advantageously, it can be provided that the inverter contains at least two transistor boards, which are arranged so as to surround and so as to be distributed evenly around the longitudinal central axis of the inverter. The transistor board can thereby be pressed against the cooling element from the inside so as to transfer heat and can thus be cooled particularly effectively. Advantageously, the capacitor board can contain at least two capacitors and the capacitors can be arranged so as to surround at least in some regions and so as to be distributed at least in some regions evenly around the longitudinal central axis. Advantageously, the transistor boards can be arranged so as to surround and so as to be distributed at least in some regions evenly around the longitudinal central axis and around the capacitors.

Advantageously, the cooling element can surround the at least one capacitor of the capacitor board on several sides, so that the at least one capacitor is stabilized against vibration and is cooled. Advantageously, the at least one transistor board and the capacitor board can be material bonded to one another, preferably welded, and can thus be contacted in an electrically conductive manner. Advantageously, the respective transistor board and the capacitor board can be connected to one another on one side so as to allow relative movement between the respective transistor board and the capacitor board. This can be critical during assembling and beneficial for compensating of a thermal expansion and contraction during operation of the inverter.

Advantageously, it can be provided that the inverter in each case has a spring element and an electrically conductive contact plate for each of the at least one transistor board. The respective spring element can thereby be arranged axially between the respective contact plate and the respective transistor board, and can resiliently connect the respective transistor board and the respective contact plate to one another. In response to the axial pressing force on the respective contact plate, the respective transistor board can then be pressed via the respective spring element against the cooling element so as to transfer heat. Advantageously, the respective transistor board can be arranged axially adjacent to the cooling element. Advantageously, the respective contact plate and the respective spring element can be arranged at the respective transistor board so as to face axially away from the cooling element.

Advantageously, the respective transistor board and the respective contact plate can be material bonded to one another, preferably welded, and can thus be contacted in an electrically conductive manner. Advantageously, the respective transistor board and the respective contact plate can be connected to one another on one side. Advantageously, the respective transistor board and the respective contact plate can be connected to one another so as to allow relative movement between the transistor board and the respective contact plate.

Advantageously, the respective spring element can be material bonded, preferably welded, to the respective contact plate. However, a different securing of the respective contact plate, of the respective spring element, and of the respective transistor board to one another is generally also conceivable. The respective spring element can advantageously be formed of steel.

Advantageously, it can be provided that the inverter has an electrically insulating spacer. The spacer thereby receives the at least one capacitor of the capacitor board at least in some regions, and positions the at least one capacitor in the cooling element spaced apart from the cooling element and in an electrically insulating manner. In addition, a heat-conducting curing casting compound can be arranged between the cooling element and the at least one capacitor of the capacitor board. Advantageously, the casting compound can cure only when the capacitor board is arranged in the cooling element with the at least one capacitor and the spacer. The at least one capacitor of the capacitor board can thus be stabilized against vibration and can be cooled.

Advantageously, the at least one capacitor of the capacitor board can be received in the cooling element so as to face the longitudinal end of the inverter, which faces away from the motor. Advantageously, a receiving recess can be formed in the cooling element for the at least one capacitor of the capacitor board and for the spacer. The at least one capacitor of the capacitor board can then be received in the receiving recess of the cooling element. The at least one capacitor can thereby be surrounded by the cooling element transversely to the longitudinal central axis and laterally around the longitudinal central axis. The at least one capacitor of the capacitor board can thus be cooled effectively, inter alia by external air by means of a heat exchange via the cooling element and the heat-conducting casting compound. Advantageously, the capacitor board can contain several capacitors. In this case, the capacitors can surround or encircle the longitudinal central axis.

Advantageously, it can be provided that the inverter has an electrically insulating carrier, preferably made of plastic. The capacitor board can then be arranged on the carrier together with the at least one transistor board, which is firmly connected to the capacitor board, and the capacitor board can be firmly connected, preferably screwed, to the carrier. Advantageously, the inverter can have further components, which are firmly connected, preferably screwed, to the carrier. For instance, the inverter can have a control board, which is firmly connected, preferably screwed, to the carrier. Signal contacts for controlling the control board can thereby be material bonded, preferably soldered, to the control board, and can thus be contacted in an electrically conductive manner.

Advantageously, it can be provided that the inverter contains at least one positioning unit for the at least one transistor board. The at least one positioning unit can contain at least one positioning projection and at least one positioning opening, which axially engage in each other. The positioning projection is thereby formed on the carrier and the positioning opening is formed in the at least one transistor board and/or in at least one contact plate which is arranged on the at least one transistor board and/or in at least one spring element which is arranged on the at least one transistor board.

Advantageously, it can be provided that the inverter has an EMI filter (EMI: ElectroMagnetic Interference). At a longitudinal end of the inverter, which faces away from the motor, the EMI filter can thereby be fastened to the cooling element externally and so as to transfer heat. The EMI filter can thereby be electrically contacted between the capacitor board of the inverter and direct current battery terminals of the inverter. Advantageously, the EMI filter can be contacted with the capacitor board in an electrically conductive manner. Advantageously, the EMI filter can be material bonded, preferably welded, to the capacitor board, and can thus be contacted in an electrically conductive manner. Advantageously, the EMI filter can have three positive pole contacts and three negative pole contacts, which are material bonded, preferably welded, to corresponding copper plates of the capacitor board, and which are thus contacted in an electrically conductive manner. Advantageously, the EMI filter can be material bonded, preferably welded, to the capacitor board from longitudinal end of the inverter, which faces the motor, and can thus be electrically contacted.

The invention also relates to an electric motor comprising an inverter. The inverter is thereby axially attached to the motor with a longitudinal end, which faces the motor. The motor is contacted with the inverter in an electrically conductive manner via at least one phase terminal, which extends axially to the inverter. According to the invention, the inverter is formed as described above.

With reference to its longitudinal central axis, the inverter thereby has the above-mentioned longitudinal end, which faces the motor, and a longitudinal end, which faces away from the motor. According to the intended purpose, the pot-shaped cooling element is thereby open at the longitudinal end of the inverter, which faces the motor. Advantageously, the pot-shaped cooling element externally surrounds the capacitor board and the at least one transistor board, as well as optionally further components of the inverter, on all sides towards the motor. The capacitor board and the at least one transistor board, as well as optionally further components of the inverter, can thus be protected externally and can be cooled efficiently.

Advantageously, the inverter and the motor can be firmly connected to one another, preferably screwed. Advantageously, the phase terminal can be formed in the form of a cylindrical connecting piece at least in some regions. Advantageously, the respective phase terminal of the motor can be electrically conductive. Advantageously, the respective phase terminal of the motor can be contacted in an electrically conductive manner with the respective contact plate of the inverter. Advantageously, the respective phase terminal of the motor can generate an axial pressing force on the respective contact plate. Advantageously, the respective contact plate can then press the respective transistor board via the respective spring element against the cooling element in an axial manner and so as to transfer heat by means of the axial pressing force of the phase terminal.

Advantageously, at least one cooling duct can be formed in the cooling element. Advantageously, at least one motor cooling duct can be formed in the motor.

Advantageously, the cooling duct in the cooling element of the inverter can directly engage with the motor cooling duct in the motor. Advantageously, the cooling element can have an inlet nozzle and an outlet nozzle which are fluidly connected with the at least one cooling duct in the cooling element. Advantageously, the motor can have a motor inlet nozzle and a motor outlet nozzle which are fluidly connected with the at least one motor cooling duct in the motor. Advantageously, the cooling element can have a pot element and a cover plate aligned transversely to the longitudinal central axis. Advantageously, the inlet or outlet nozzle can be integrally formed with the pot element and can directly engage with the motor inlet or outlet nozzle in the motor. Directly engaging means that when the inverter and the motor are rigidly connected to one another, the cooling duct in the cooling element is in communication with the motor cooling duct in the motor, without the need to connect additional tubing.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
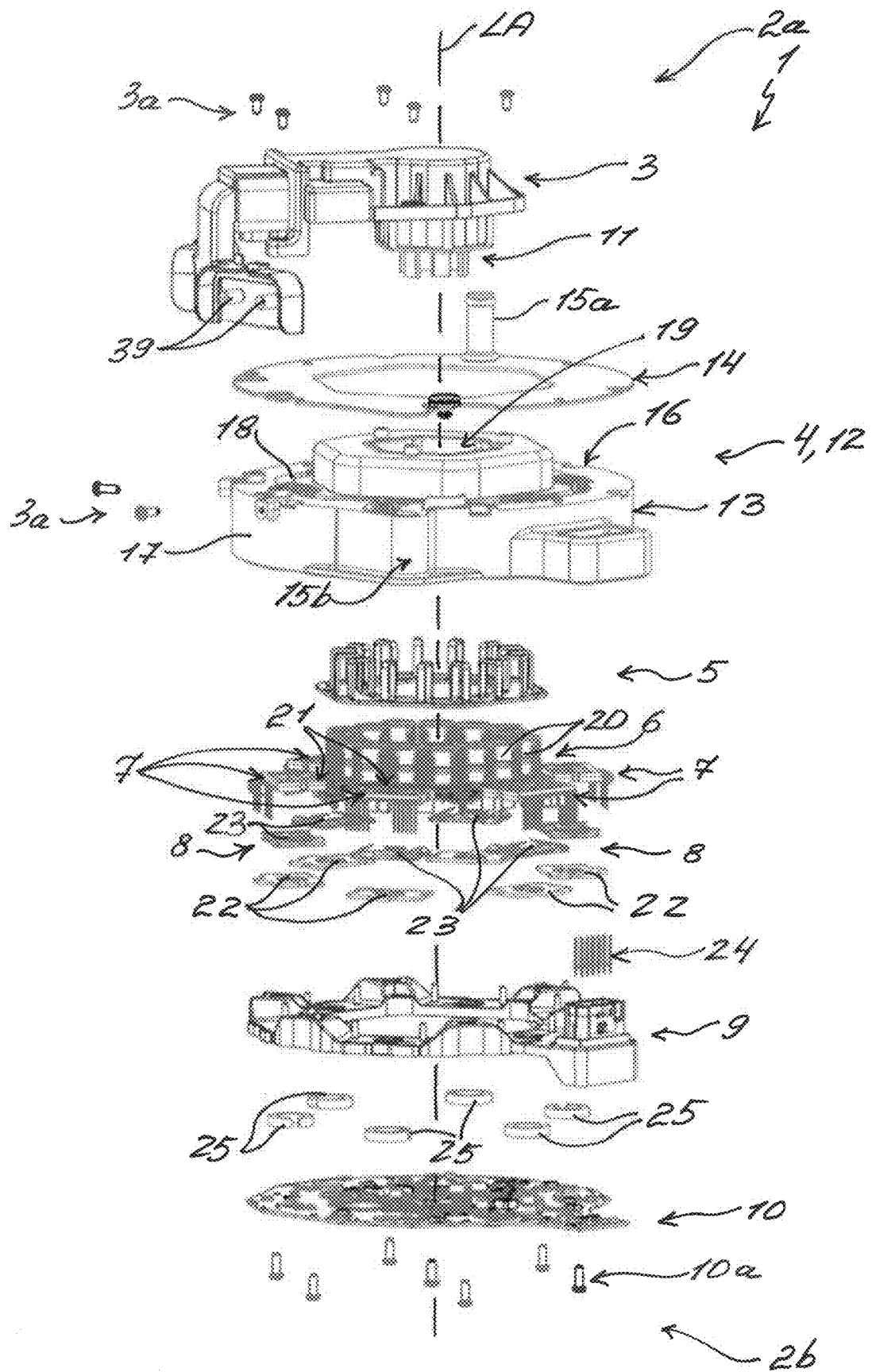
FIG. 1 shows an exploded view of an inverter according to the invention.

FIG. 1 shows an exploded view of an inverter 1 according to the invention. The inverter 1 thereby has a longitudinal central axis LA. With respect to the longitudinal central axis LA, a longitudinal end 2*a* facing away from the motor and a longitudinal end 2*b* facing the motor are specified in the inverter 1. The inverter 1 thereby has an EMI filter 3, a cooling element 4, a spacer 5, a capacitor board 6, six transistor boards 7, six contacting units 8, a carrier 9, and a control board 10.

The EMI filter 3 is electrically connected between the capacitor board 6 and direct current battery terminals 39 of the inverter. The EMI filter 3 thereby has an electric filter circuit of several capacitors, not shown here, and a choke 11. The capacitors and the choke 11 of the EMI filter are received in an EMI housing 38 of the EMI filter 3. The EMI filter 3 is material bonded, preferably welded, to the capacitor board 6 via the throttle 11, and is thus contacted in an electrically conductive manner. The EMI filter 3 is screwed to the cooling element 3 by means of a screw group 3*a* comprising several screws.

The cooling element 4 is pot-shaped and forms a housing 12 of the inverter. The cooling element 4 thereby receives the other components of the inverter 1 and surrounds them externally. The cooling element 4 thereby has a pot-shaped pot element 13, a cover plate 14, a separate inlet nozzle 15a, and an outlet nozzle 15b, which is integrated in the pot element 13. The pot element 13 is thereby produced of aluminum by means of a die casting process, and the cover plate 14 as well as the inlet nozzle 15a are material bonded, preferably soldered, to the pot element. The cooling element 4 thereby has a bottom 16 and a wall 17. The bottom 16 is thereby aligned transversely to the longitudinal central axis LA, and the wall 17 is aligned parallel to the longitudinal central axis LA, and surrounds the longitudinal central axis LA. In addition, the cooling element 4 has a cooling duct 18, through which a cooling liquid can flow, and a passage opening 19 for the EMI filter 3. The passage opening 19 is thereby formed centrally in the bottom 16, and the cooling duct 18 is formed in the bottom 16 so as to surround the passage opening 19. The cooling duct 18 is thereby formed to be open on one side in the pot element 13 and is fluidically closed externally by means of the cover plate 14.

The capacitor board 6 has several capacitors 20, which are arranged symmetrically around the longitudinal central axis LA on the capacitor board 6. The capacitors 20 are thereby material bonded, preferably welded, to the capacitor board 6, and are thus contacted in an electrically conductive manner.

The transistor boards 7 are arranged so as to surround the longitudinal central axis LA and so as to be distributed evenly around the capacitors 20 of the capacitor board 6. The transistor boards 7 are thereby material bonded, preferably welded, to the capacitor board 6 at contact points 21, and are thus contacted in an electrically conductive manner.

The spacer 5 is electrically insulating and is arranged axially between the capacitor board 6 and the bottom 16 of the cooling element 4. The spacer 5 thereby receives the capacitors 20 of the capacitor board 6 and insulates them electrically from the cooling element 4. In addition, a curing heat-transferring casting compound can be arranged between the capacitors 20 and the cooling element 4.

The contacting units 8 each have an electrically conductive contact plate 22 and a spring element 23. The respective contact plate 22 is thereby material bonded, preferably welded, to the respective transistor board 7, and is thus contacted in an electrically conductive manner. In addition, the contact plate 22 is material bonded, preferably welded, to the respective spring element 23. The contact plates 22 are provided for contacting with phase terminals of the motor, as will be described in more detail below on the basis of FIG. 24 and FIG. 25.

The carrier 9 is formed of plastic and carries the capacitor board 6 comprising the transistor boards 7. The contacting units 8 are thereby arranged between the carrier 9 and the transistor boards 7. The contact plates 22 are thereby arranged so as to face the carrier 9. The capacitor board 6 is screwed to the carrier 9 by means of a screw group comprising several screws, not shown here. In addition, contact elements 24 are received in the carrier 9.

The control board 10 is screwed to the carrier 9 by means of a screw group 10a comprising several screws. In addition, six ring-shaped cores 25 are arranged between the control board 10 and the carrier 9. If the inverter 1 is contacted with the motor, as will be described in more detail below on the basis of FIG. 24 and FIG. 25, the respective cores 25 are located around the respective phase terminals of the motor.

Figure 2:
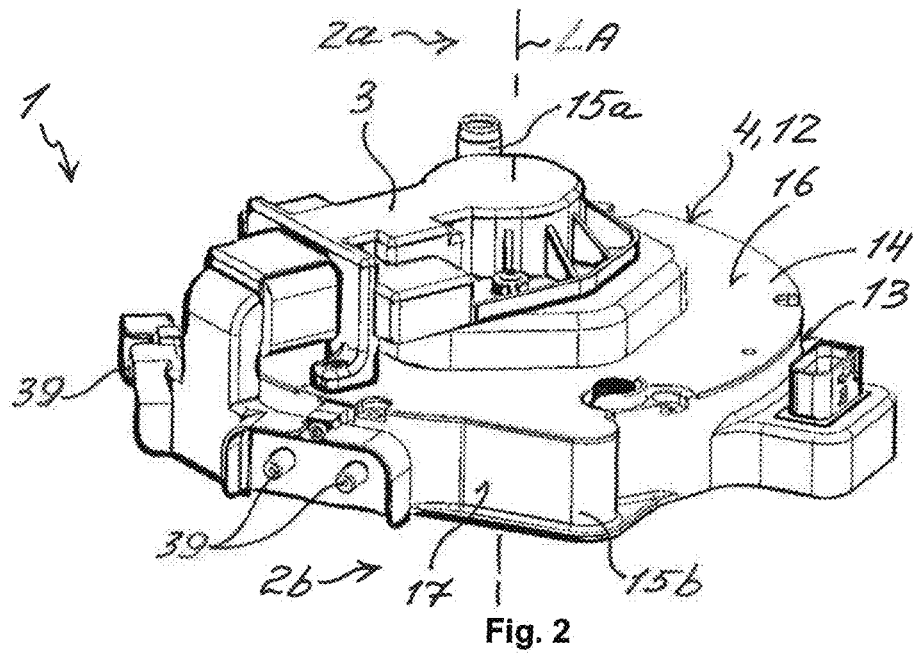
FIG. 2 shows a view and a sectional view of the inverter according to the invention.

FIG. 2 shows a view of the inverter 1 according to the invention. Here, the inverter 1 is shown in the assembled state from the longitudinal end 2a, which faces away from the motor.

Figure 3:
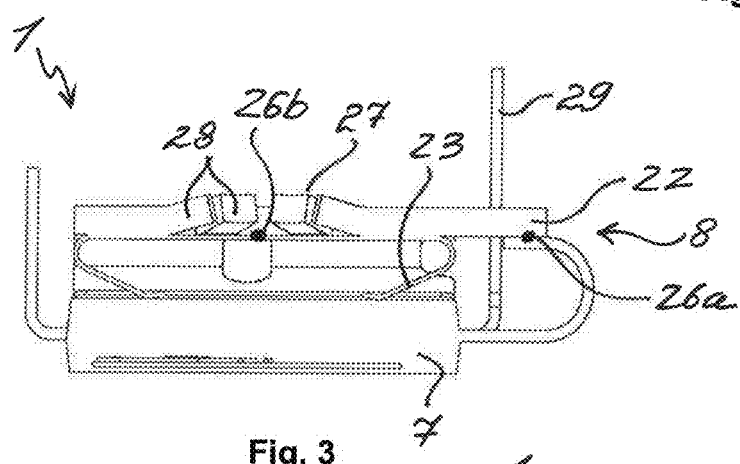
FIGS. 3 and 4 show a sectional view and a view of a transistor board comprising a contacting unit in the inverter according to the invention.
Figure 4:
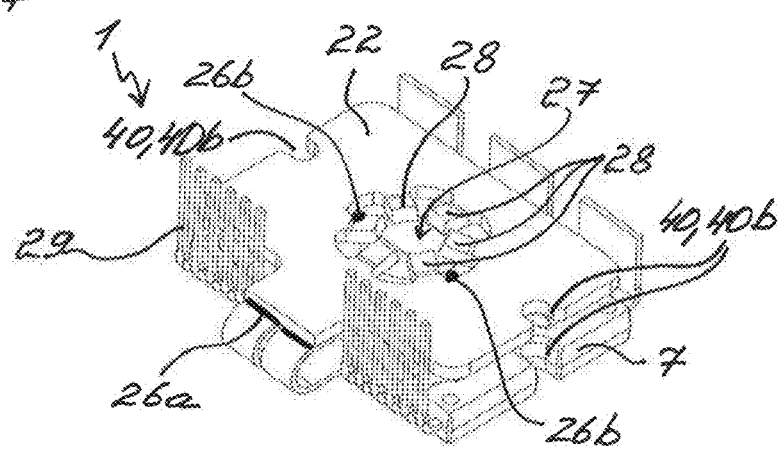

FIG. 3 shows a sectional view, and FIG. 4 shows a view of one of the transistor boards 7 comprising the contacting unit 8. The respective contact plate 22 of the contacting unit 8 is thereby material bonded, preferably welded, to the respective transistor board 7 at a first point 26a, and is thus contacted in an electrically conductive manner. In addition, the contact plate 22 is material bonded, preferably welded, to the respective spring element 23 at a second point 26b. The spring element 23 is thereby resiliently arranged between the contact plate 22 and the transistor board 7. A contact opening 27 for inserting and for contacting the respective phase terminal of the motor, is thereby formed centrally in the contact plate 22, as will be described in more detail below on the basis of FIG. 24 and FIG. 25. In addition, six contact pins 28, which are aligned to the inside into the contact opening 27 and from the spring element 23 axially to the outside, are formed at the contact opening 27. In addition, signal pins 29 can be seen at the respective transistor board 7.

Figure 5:
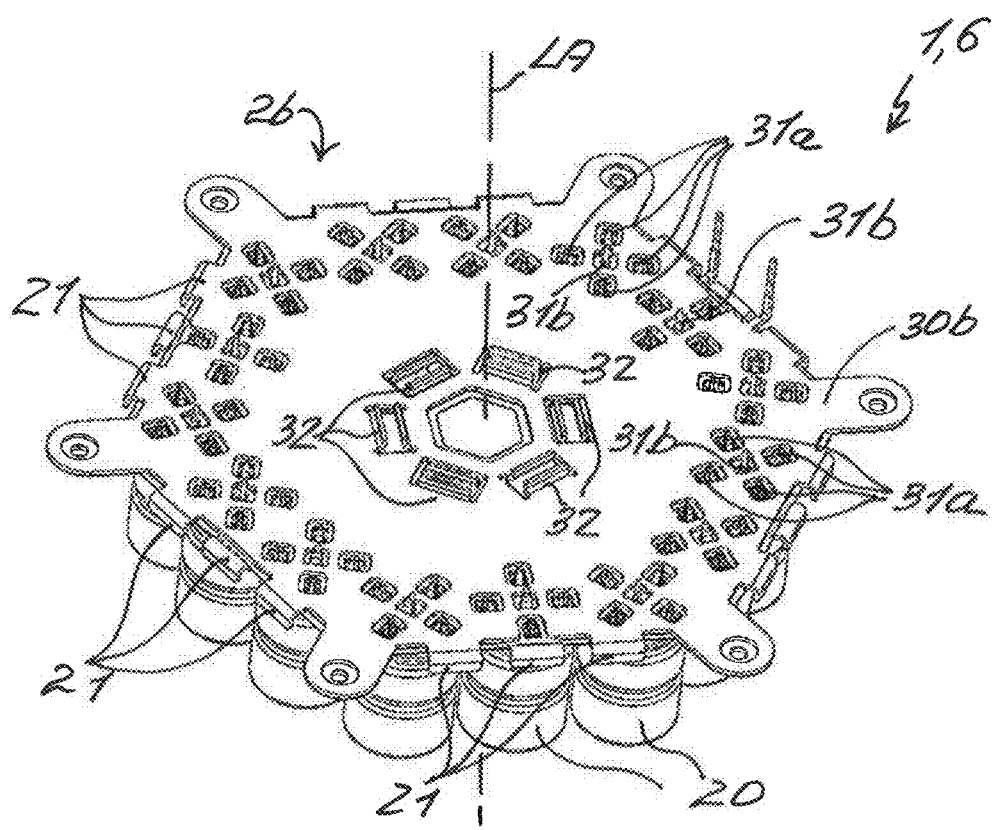
FIGS. 5 and 6 show views of a capacitor board of the inverter according to the invention.
Figure 6:
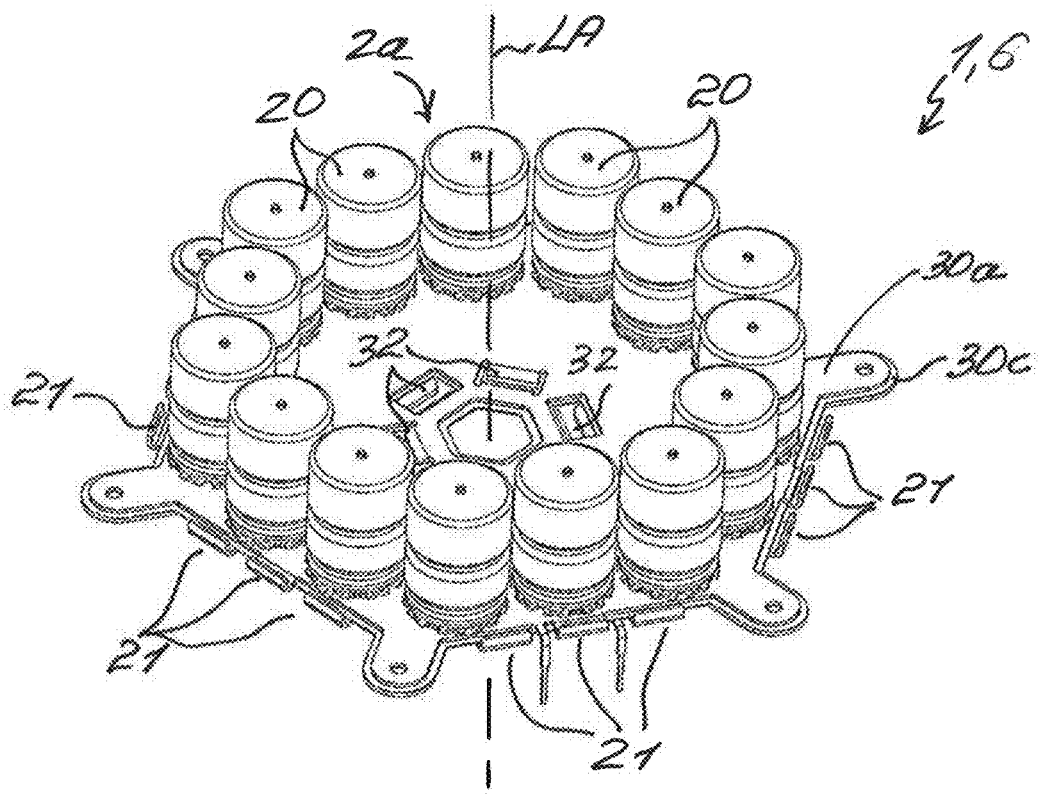

FIG. 5 shows a view of the capacitor board 6 from the longitudinal end 2b, which faces the motor. FIG. 6 shows a view of the capacitor board 6 from the longitudinal end 2a, which faces away from the motor. The capacitor board 6 thereby has an electrically conductive negative pole plate 30a and an electrically conductive positive pole plate 30b. A dielectric intermediate plate 30c is arranged between the negative pole plate 30a and the positive pole plate 30b. In the inverter 1, the negative pole plate 30a is arranged so as to face the longitudinal end 2a, which faces away from the motor, and the positive pole plate 30b is arranged so as to face the longitudinal end 2b, which faces the motor. The respective capacitor 20 is thereby connected to the negative pole plate 30a at four negative pole contact points 31a and to the positive pole plate 30b at a positive pole contact point 21b, and material bonded, preferably welded, and is thus contacted in an electrically conductive manner. In addition, six contact points 32 can be seen in the center, which are provided for contacting the capacitor board 6 with the power supply bus bars of the EMI filter 3.

Figure 7:
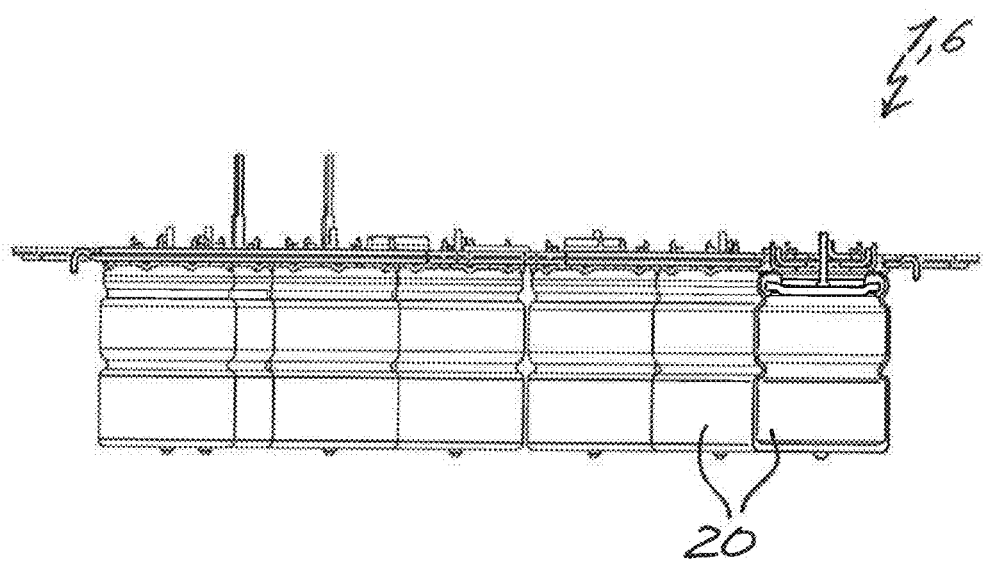
FIGS. 7 and 8 show sectional views of the capacitor board of the inverter according to the invention.
Figure 8:
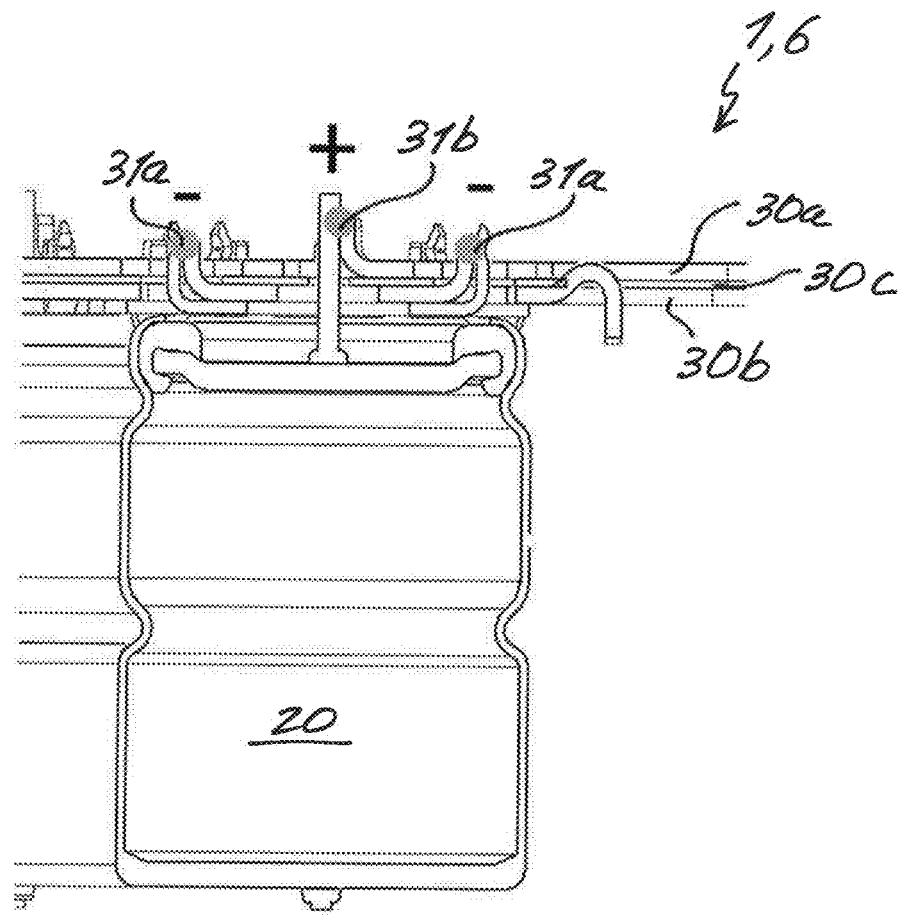

FIG. 7 shows a sectional view, and FIG. 8 shows an enlarged sectional view of the capacitor board 6. Two of the four negative pole contact points 31a and the positive pole contact point 31b can be seen particularly well in FIG. 7 and in FIG. 8.

Figure 9:
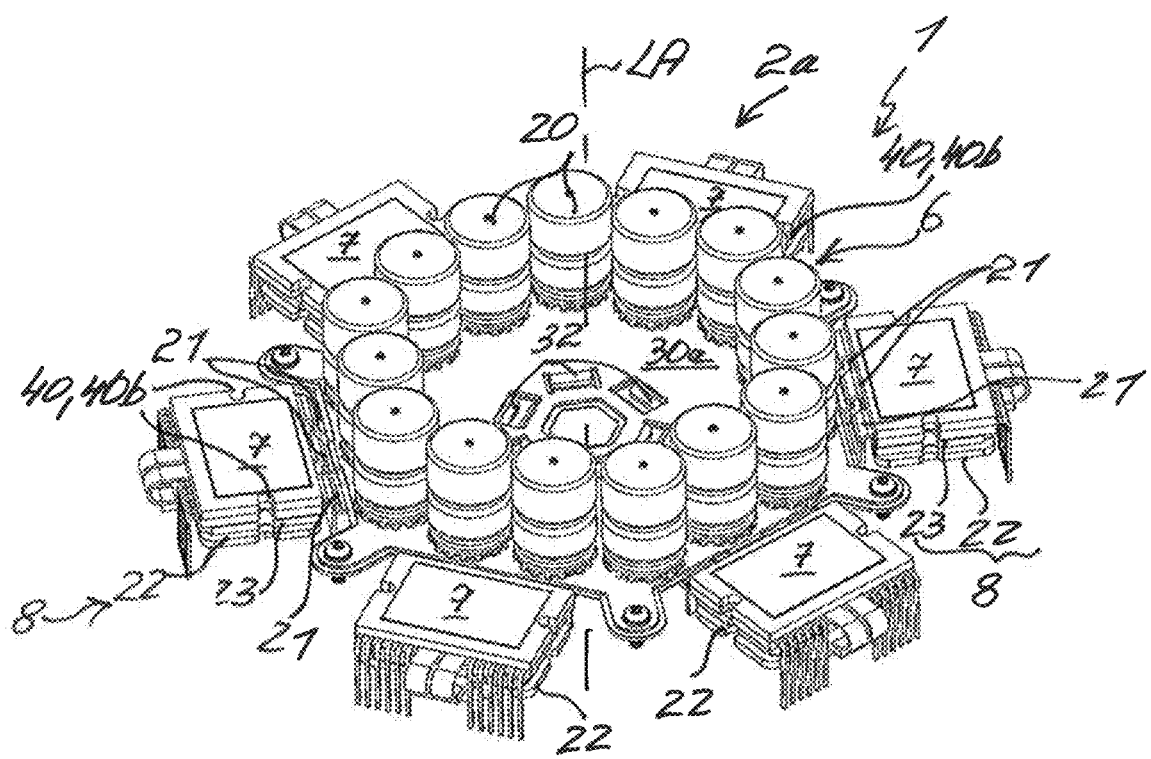
FIGS. 9 and 10 show views of the capacitor board comprising transistor boards in the inverter according to the invention.
Figure 10:
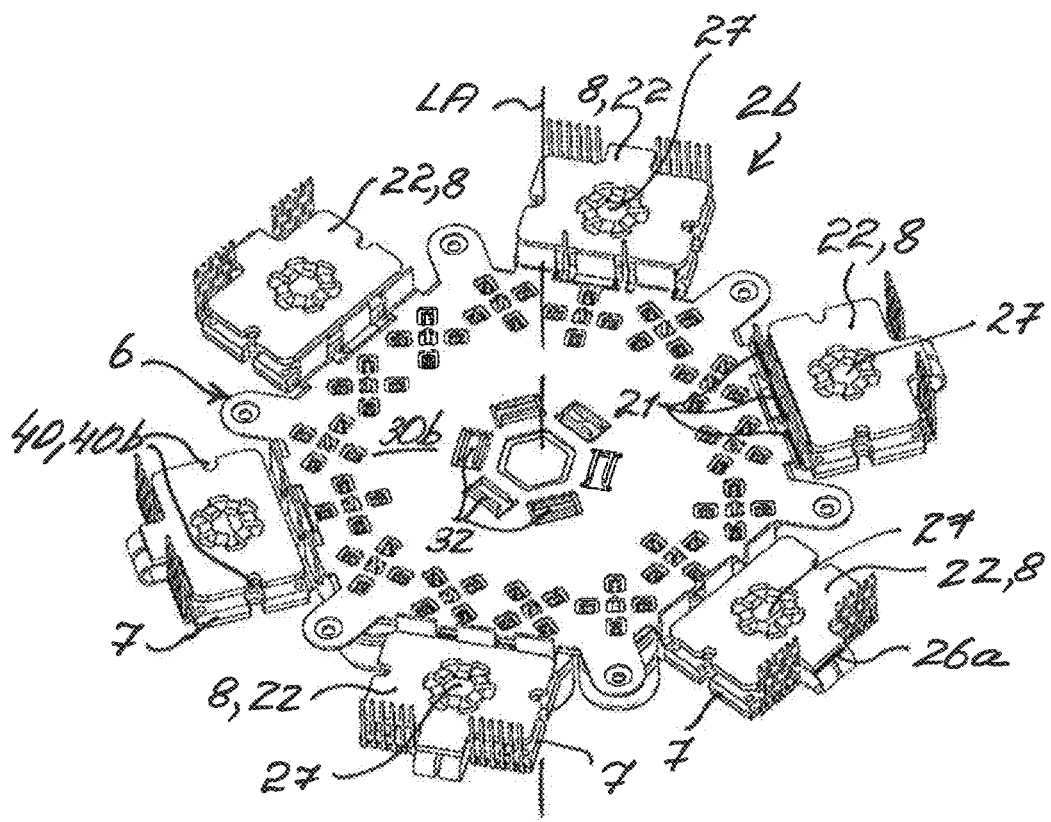

FIG. 9 shows a view of the capacitor board 6 comprising the transistor boards 7 from the longitudinal end 2a, which faces away from the motor. FIG. 10 shows a view of the capacitor board 6 comprising the transistor boards 7 from the longitudinal end 2b, which faces the motor. The respective transistor boards 7 are thereby material bonded, preferably welded, to the capacitor board 6 at three respective contact points 21, and are thus contacted in an electrically conductive manner. The respective transistor board 7 is thereby contacted in an electrically conductive manner with two contact points 21 with the positive pole plate 30b and with one contact point 21 with the negative pole plate 30a.

Figure 11:
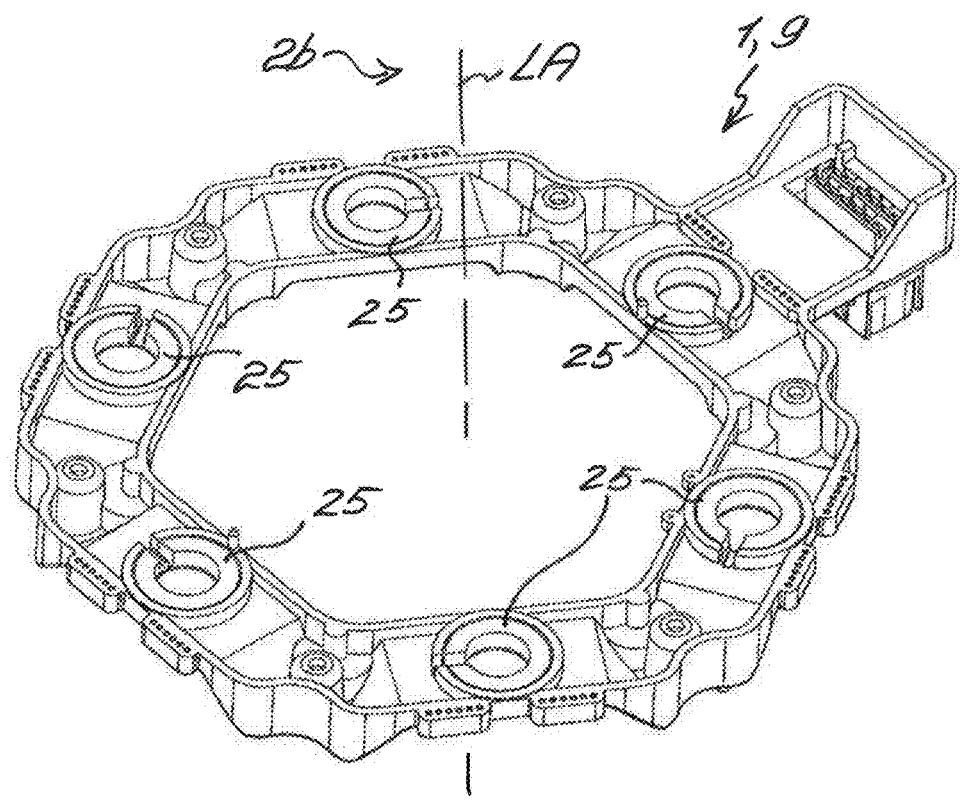
FIGS. 11 and 12 show views of a carrier of the inverter according to the invention.
Figure 12:
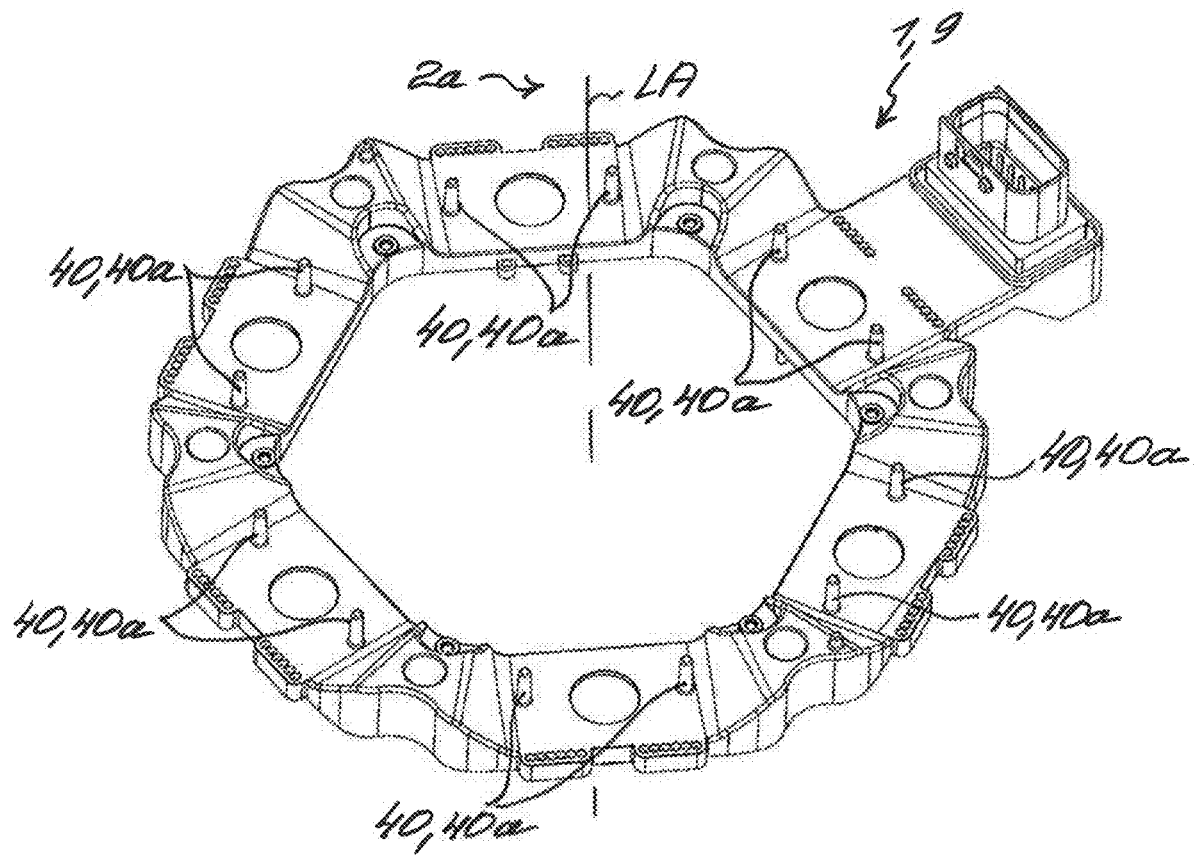

FIG. 11 shows a view of the carrier 9 from the longitudinal end 2b, which faces the motor. FIG. 12 shows a view of the carrier 9 from the longitudinal end 2a, which faces away from the motor. The ring-shaped cores 25 are already arranged at the carrier 9 in FIG. 11. The carrier 9 is thereby dielectric or electrically non-conductive and is formed of plastic.

Figure 13:
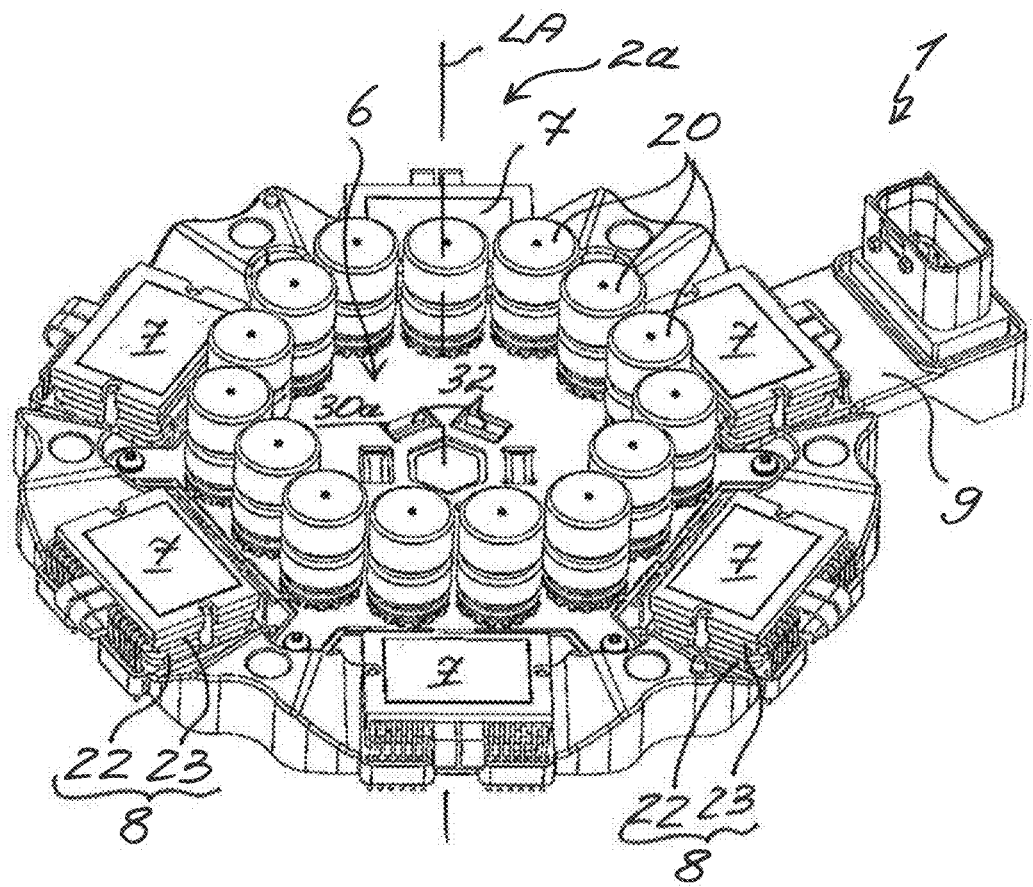
FIG. 13 shows a view of the carrier comprising the capacitor board and comprising the transistor boards in the inverter according to the invention.

FIG. 13 shows a view of the carrier 9 comprising the capacitor board 6 and comprising the transistor boards 7, which are arranged on a side of the carrier 9 facing the longitudinal end 2a, which faces away from the motor. The arrangement shown in FIG. 9-10 is thus arranged in the carrier 9. The capacitor board 6 is thereby screwed to the carrier 9 by means of a screw group 6a comprising several screws.

Figure 14:
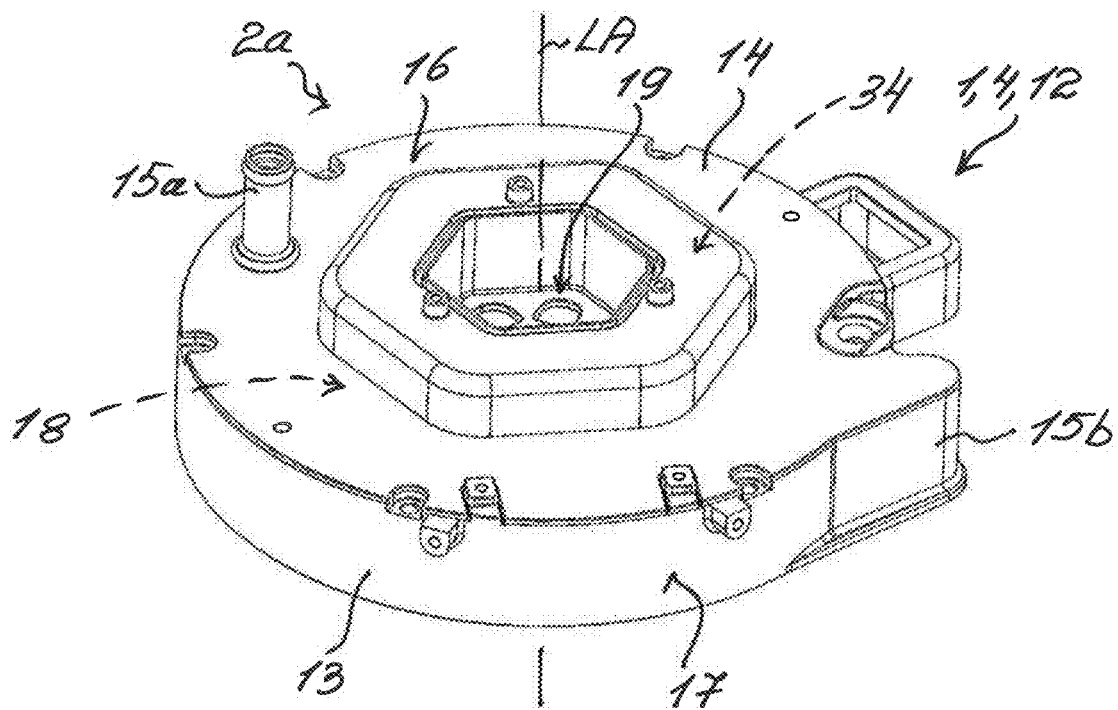
FIGS. 14 and 15 show a view and an exploded view of a cooling element in the inverter according to the invention.
Figure 15:
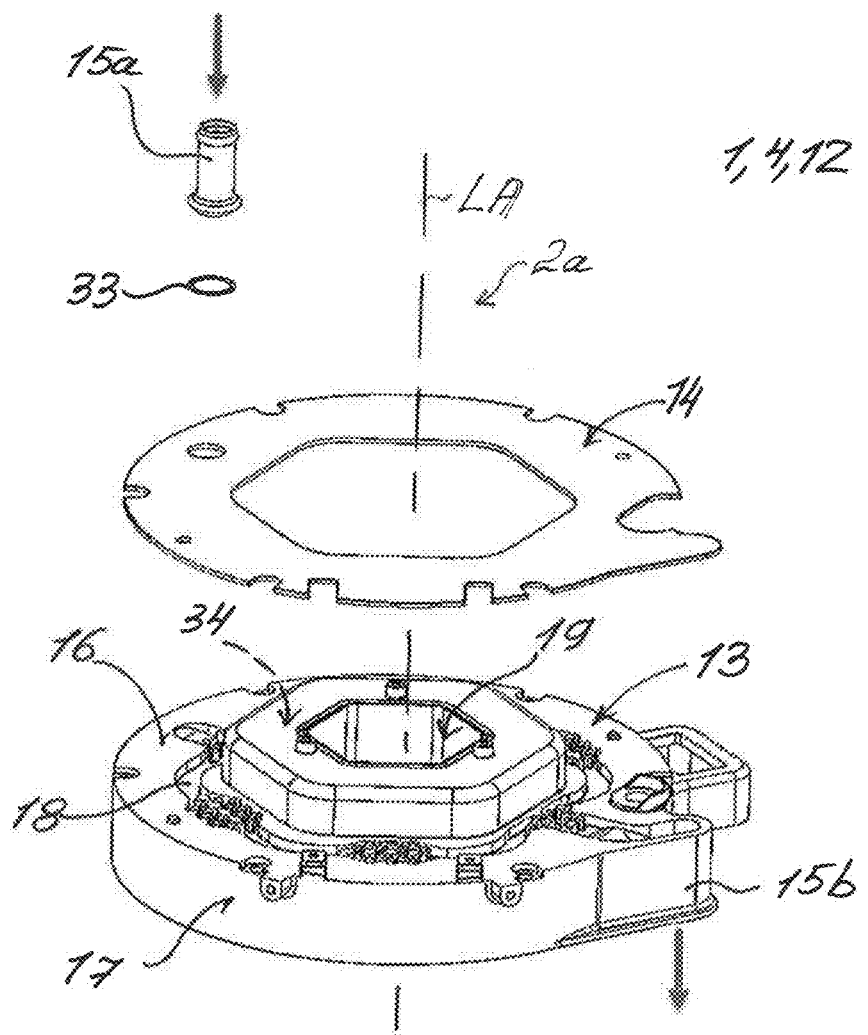

FIG. 14 shows a view of the cooling element 4 from the longitudinal end 2a, which faces away from the motor. FIG. 15 shows an exploded view of the cooling element 4 from the longitudinal end 2a, which faces away from the motor. A solder ring 33 can be seen here, by means of which the inlet nozzle 15a is soldered to the pot element 13 and/or the cover plate 14.

Figure 16:
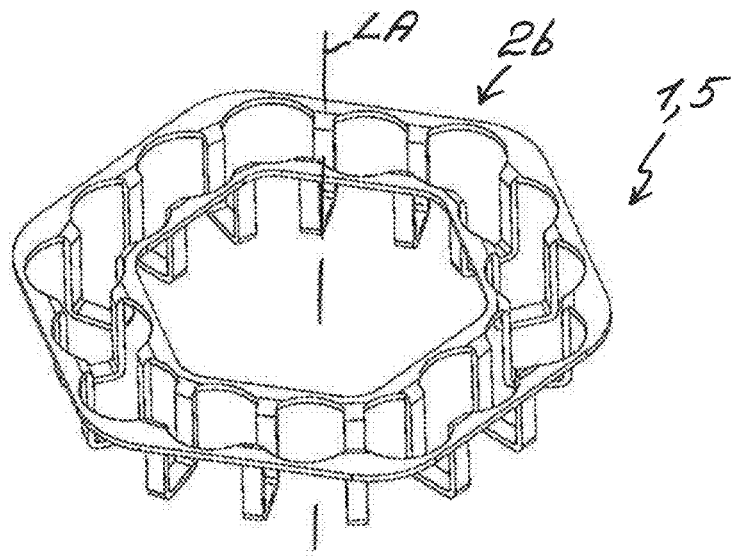
FIG. 16 shows a view of a spacer of the inverter according to the invention.

FIG. 16 shows a view of the spacer 5 from the longitudinal end 2b, which faces the motor. The spacer 5 is dielectric or electrically non-conductive, respectively.

Figure 17:
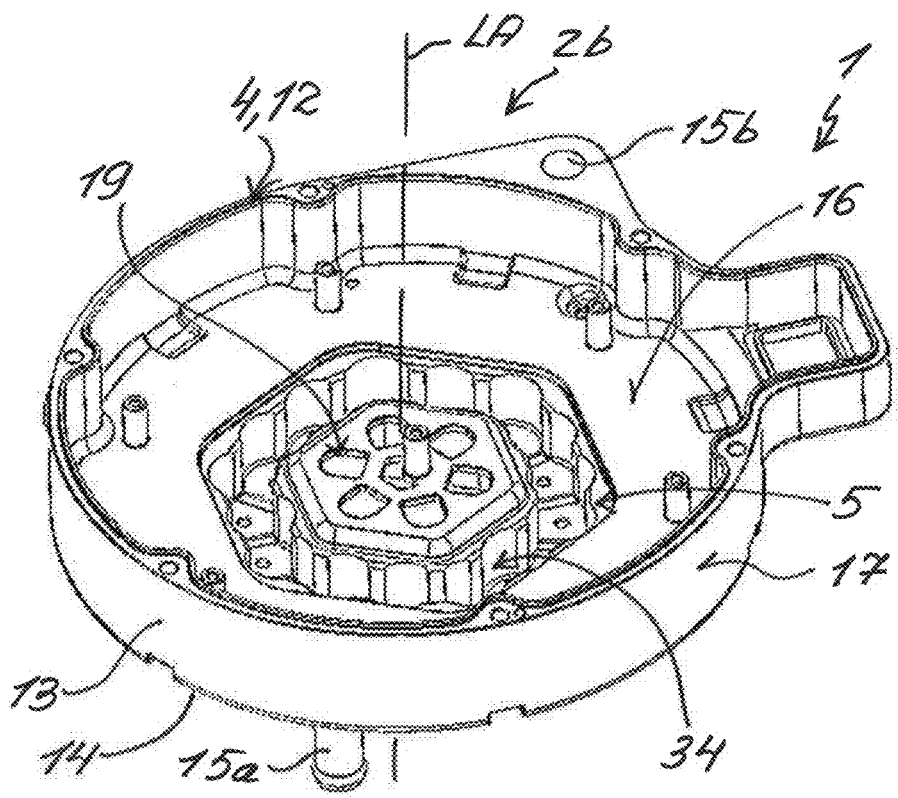
FIG. 17 shows a view of the cooling element comprising the spacer in the inverter according to the invention.

FIG. 17 shows a view of the cooling element 4 comprising the spacer 5 from the longitudinal end 2b, which faces the motor. The spacer 5 is thereby arranged in a receiving recess 34 of the cooling element 4.

Figure 18:
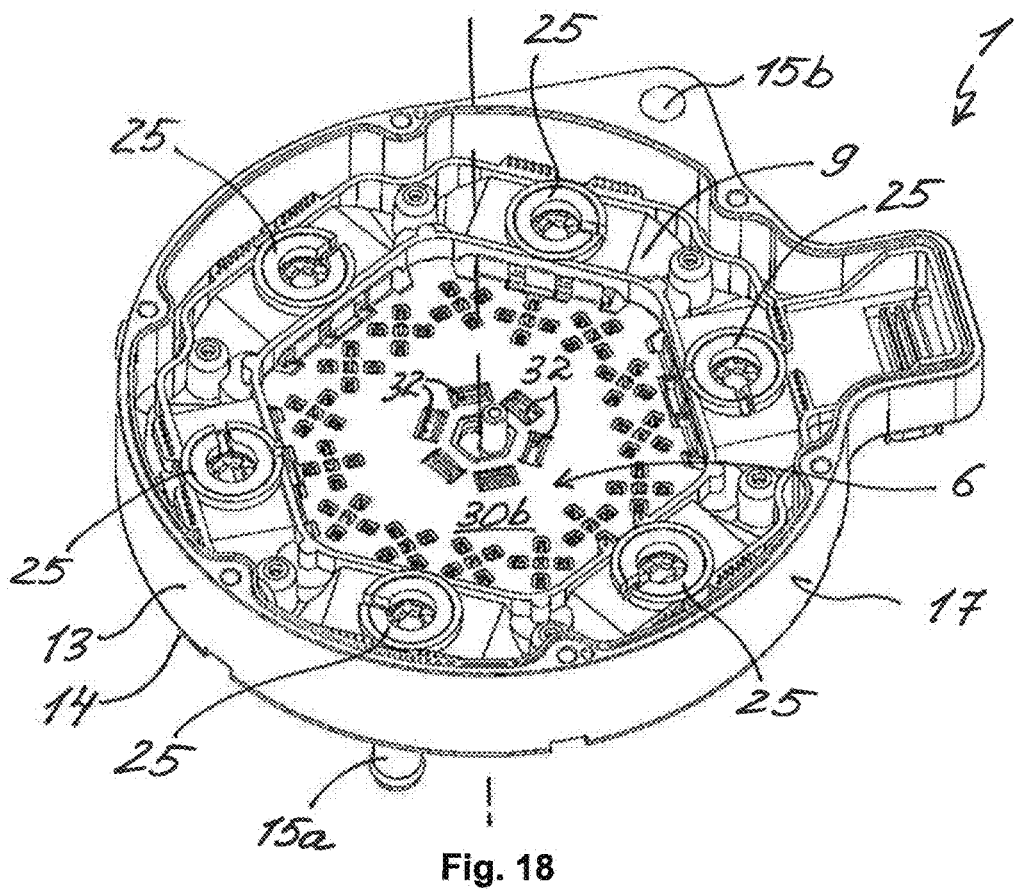
FIG. 18 shows a view of the cooling element comprising the spacer and comprising the arrangement from FIGS. 9 and 10 in the inverter according to the invention.

FIG. 18 shows a view of the cooling element 4 comprising the spacer 5 and comprising the arrangement from FIG. 9-10 from the longitudinal end 2b, which faces the motor. Here, the capacitors 20 are already received in the spacer 5. The capacitors 20 are thereby received in the receiving recess 34 and are surrounded by the cooling element 4 transversely to the central longitudinal axis LA and so as to surround the longitudinal central axis LA. The capacitors 20 can thus be cooled effectively. In addition, a heat-conductive curable casting compound, not visible here, is arranged between the cooling element 4 and the capacitors 20, and can support the heat exchange between the capacitors 20 and the cooling element 4.

Figure 19:
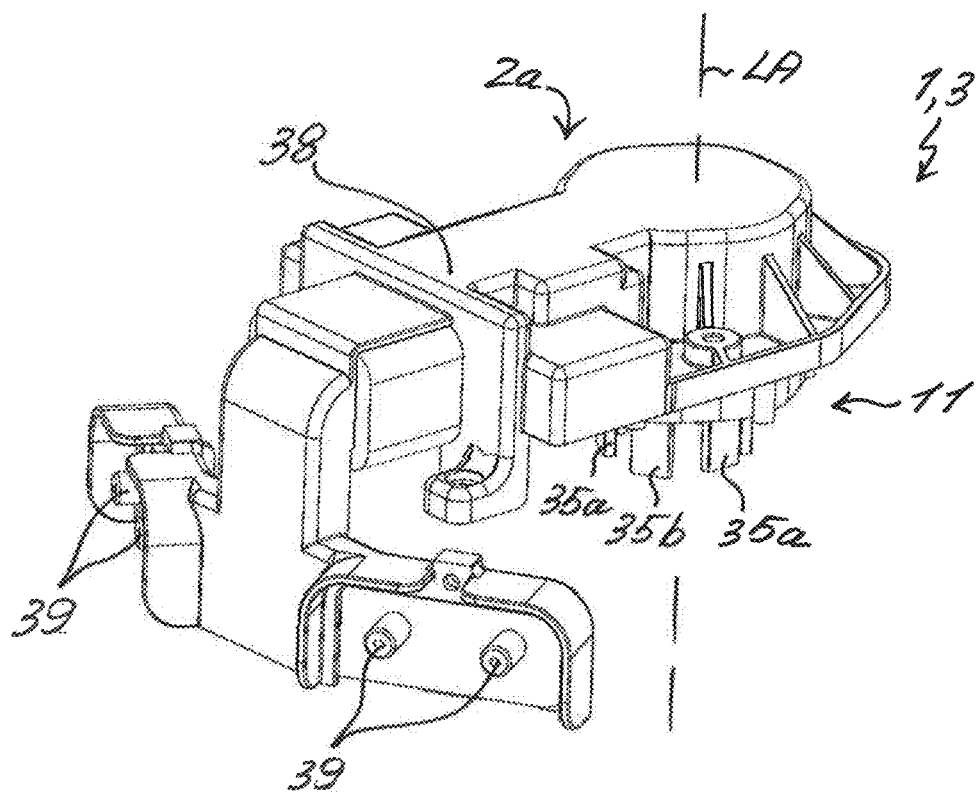
FIG. 19 shows a view of an EMI filter of the inverter according to the invention.

FIG. 19 shows a view of the EMI filter 3 from the longitudinal end 2a, which faces away from the motor. In particular some of three flat negative pole contacts 35a and three flat positive pole contacts 35b of the choke 11 can be seen here. The EMI filter 3 has several capacitors, which are switched to form a filter circuit. The filter circuit is thereby arranged in the electrically insulating EMI housing 38.

Figure 20:
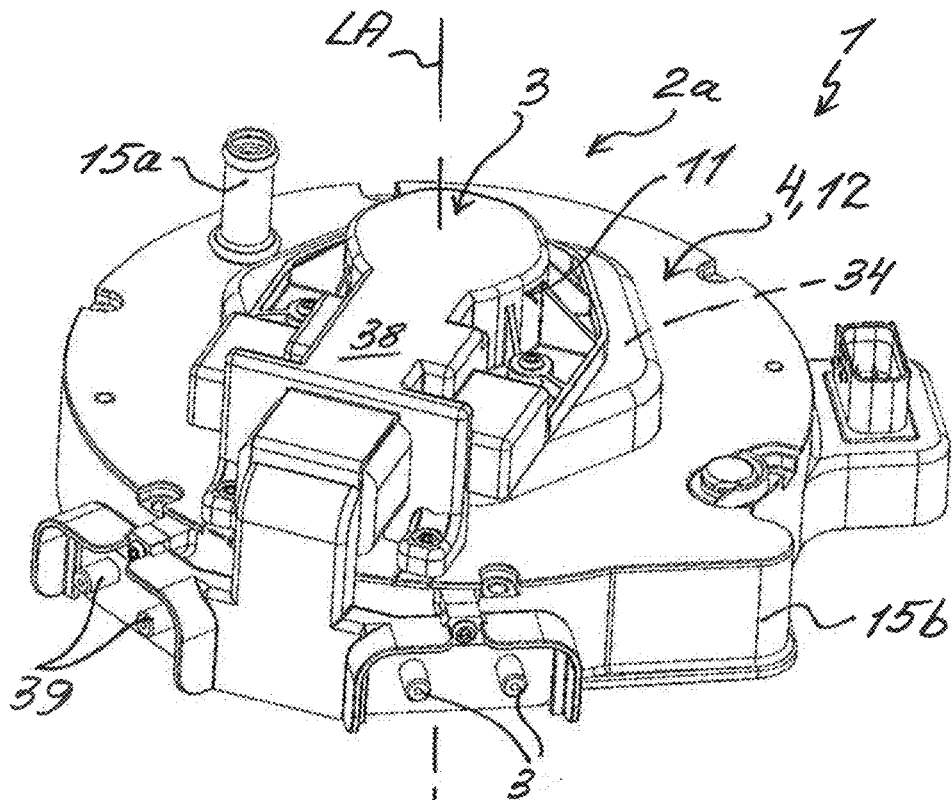
FIGS. 20 and 21 show views of the arrangement from FIG. 18 comprising the EMI filter in the inverter according to the invention.
Figures 21, 22:
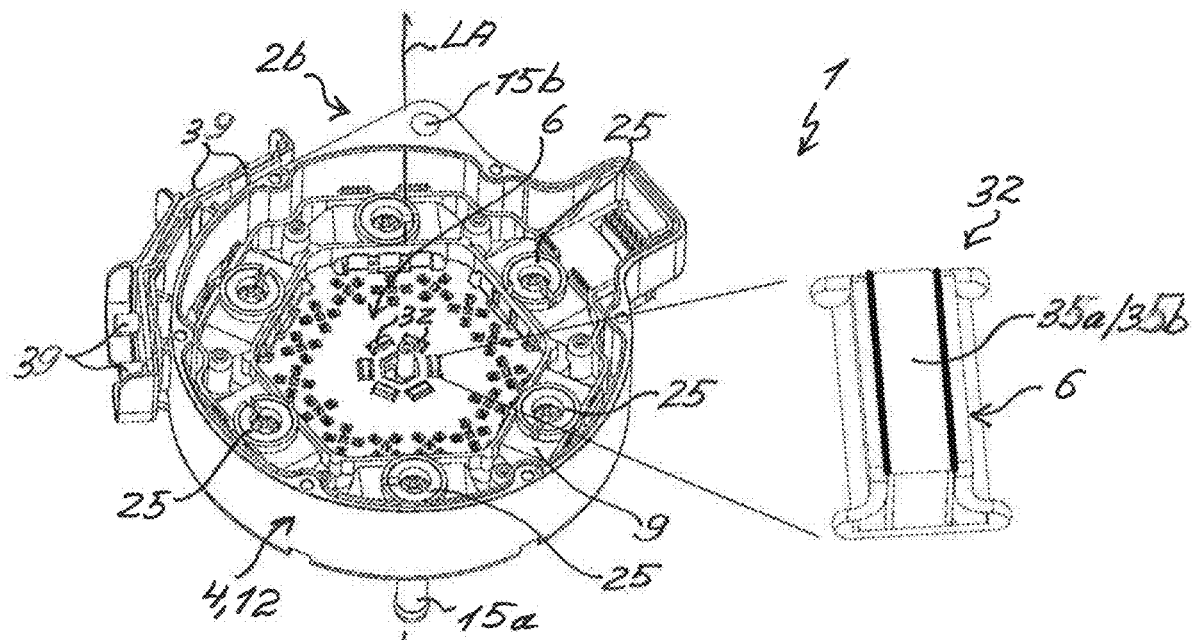
FIG. 22 shows an enlarged view of battery contact points between the EMI filter and the capacitor board in the inverter according to the invention.

FIG. 20 shows a view of the arrangement from FIG. 18 comprising the EMI filter 3 from the longitudinal end 2a, which faces away from the motor. FIG. 21 shows a view of the arrangement from FIG. 18 comprising the EMI filter 3 from the longitudinal end 2b, which faces away from the motor. The EMI filter 3 is thereby material bonded, preferably welded, to the capacitor board 6 at contact points 32, and is thus contacted in an electrically conductive manner. The negative pole contacts 35a of the choke 11 are thereby electrically contacted with the negative pole plate 30a of the capacitor board 6, and the positive pole contacts 35b of the choke 11 are electrically contacted with the positive pole plate 30b of the capacitor board 6.

An enlarged view of the contact points 32 of the capacitor board 6 is shown in FIG. 22. The respective contact point 32 is thereby formed by two longer seams on both sides of the negative pole contact 35a or at the positive pole contact 35b of the power supply bus bars, respectively.

Figure 23:
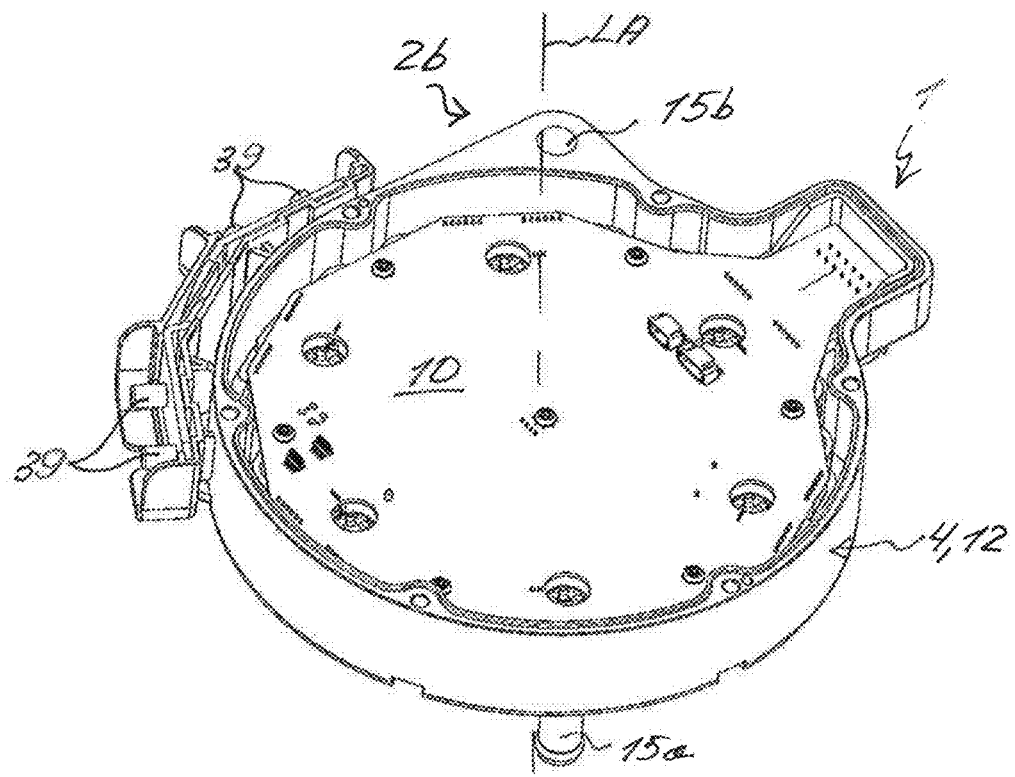
FIG. 23 shows a view of the arrangement from FIG. 18 comprising a control board in the inverter according to the invention.

FIG. 23 shows a view of the arrangement from FIG. 18 comprising the control board 10 from the longitudinal end 2b, which faces the motor. The control board 10 is thereby screwed to the carrier 9 by means of the screw group 10a comprising several screws.

Figure 24:
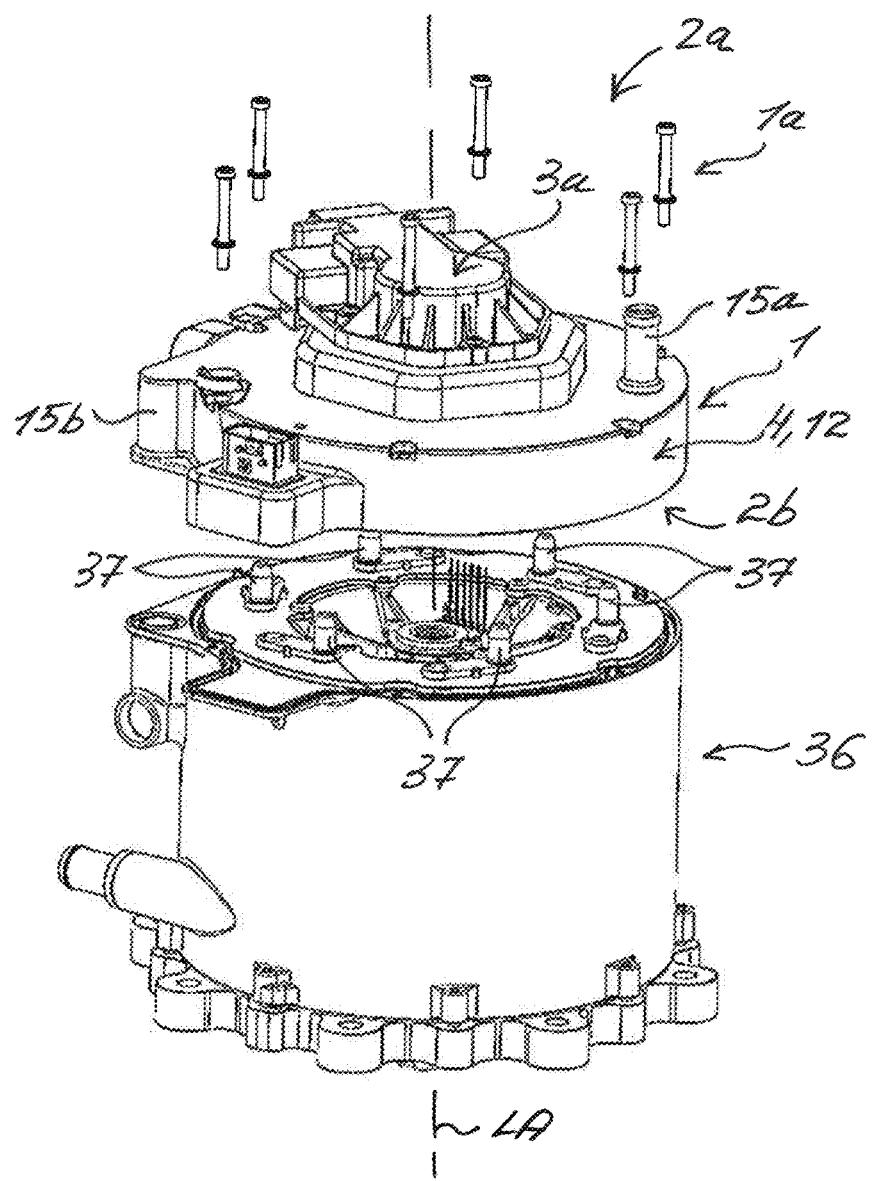
FIG. 24 shows an exploded view of a motor according to the invention comprising the inverter according to the invention.

FIG. 24 shows an exploded view of a motor 36 according to the invention comprising the inverter 1 according to the invention. The inverter 1 is thereby axially attached to the motor 36 with the longitudinal end 2b, which faces the motor. The motor 36 is electrically contacted with the inverter 1 via six phase terminals 37. The phase terminals 37 are thereby formed at least in some regions in the form of a cylindrical connecting piece, which extends axially towards the inverter 1. The inverter 1 and the motor 36 are screwed to one another by means of a screw group 1a comprising several screws.

Figure 25:
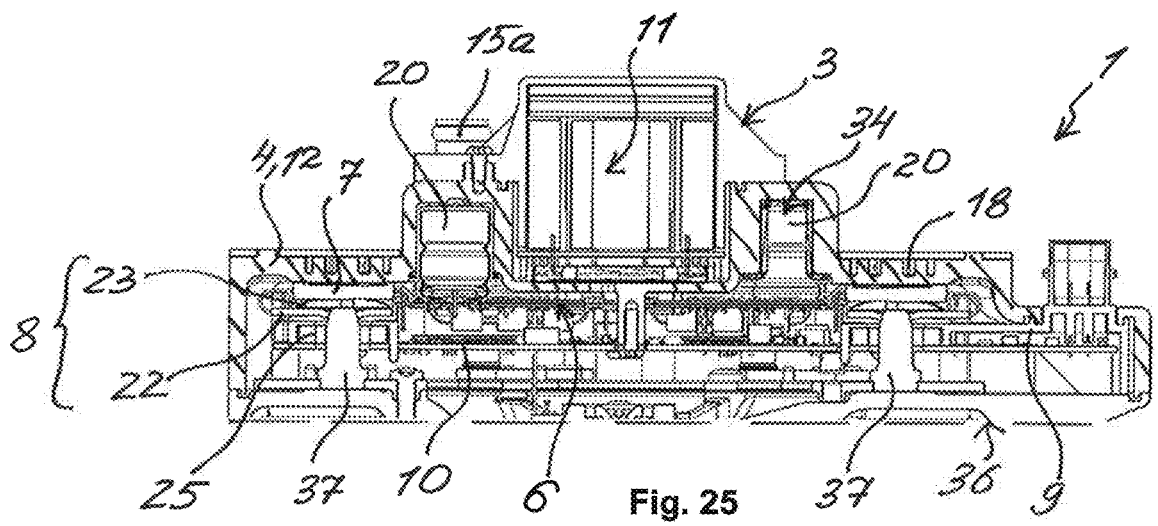
FIG. 25 shows a sectional view of the motor according to the invention comprising the inverter according to the invention.

FIG. 25 shows a sectional view of the motor 36 comprising the inverter 1. As can be seen particularly well in FIG. 25, the respective phase terminal 37 protrudes axially into the inverter 1 and is electrically contacted with the respective contact plate 22. The respective phase terminal 37 is thereby received in the contact opening 27 of the contact plate 22 and is thus connected to the contact plate 22 in an electrically conductive manner.

The phase terminal 37 is thereby formed in such a way that an axial pressing force acts on the contact plate 22. The respective contact plate 22 therefore presses the respective transistor board 7 via the respective spring element 23 against the cooling element 4 so as to transfer heat.

As can be seen in FIG. 4 and FIG. 12, the inverter 1 contains six positioning units 40 for each of the transistor boards 7. The respective positioning unit 40 contains two positioning projections 40a and six positioning openings 41b. The positioning projections 41a are formed on the carrier 9 and projects axially to the respective transistor board 7. Two of the positioning openings 41b are formed in the respective transistor board 7, two of the position openings 41b are formed in the respective contact plate 22, and two of the position openings 41b are formed in the respective spring element 23. The respective positioning projection 41a axially engages with the respective position opening 41b in the respective transistor board 7, with the respective position opening 41b in the respective contact plate 22, and with the respective position opening 41b in the respective spring element 23. The positioning unit 40 allows an axially compression of the assembly and prevents a side to side movement between the respective transistor plate 7, the respective contact plate 22, the respective spring element 23 and the carrier 9.

Advantageously, the design of the inverter 1 can be adapted to different diameters of the motor 36. In addition, it is possible to provide or not to provide the EMI filter 3 for the respective other motor 36, as needed.

The invention claimed is:

1. An inverter for an electric motor, comprising:
   a capacitor board including at least one capacitor, at least one transistor board, and a cooling element,
   the capacitor board and the at least one transistor board being electrically interconnected,
   the capacitor board and the at least one transistor board each aligned transversely to a longitudinal central axis,
   wherein the cooling element is pot-shaped and provides a housing that receives the capacitor board and the at least one transistor board;
   wherein the at least one transistor board is pressed against the cooling element from an inside so as to transfer heat.

2. The inverter according to claim 1, wherein:
   the cooling element is pot-shaped and has a pot bottom that is aligned transversely to the longitudinal central axis, and a circumferential wall that extends from a perimeter of the pot bottom and parallel to the longitudinal central axis, a passage opening for contact lines is provided centrally in the bottom, and the at least one transistor board is pressed against the pot bottom.

3. The inverter according to claim 2, wherein:

the cooling element has at least one cooling duct, through which a cooling liquid can flow, and the at least one cooling duct is disposed in the pot bottom so as to surround the passage opening.

4. The inverter according to claim 1, wherein:

the cooling element has a die cast pot element and a cover plate aligned transversely to the longitudinal central axis, at least one cooling duct that is open on one side and aligned transversely to the longitudinal central axis, is disposed in the pot element on an outer side, and the cover plate axially and sealingly closes the at least one cooling duct, the cover plate being disposed in the pot element and open on one side, and is material bonded to the pot element.

5. The inverter according to claim 1, wherein at least one of:

the at least one transistor board is annular and arranged so as to surround the longitudinal central axis, the at least one transistor board includes at least two transistor boards that are arranged so as to surround and so as to be distributed evenly around the longitudinal central axis.

6. The inverter according to claim 1, further comprising:

a spring element and an electrically conductive contact plate provided for the at least one transistor board, wherein the spring element is arranged axially between the contact plate and the at least one transistor board, and resiliently connects the at least one transistor board and the contact plate to one another, and in response to an axial pressing force on the contact plate, the at least one transistor board is pressed via the spring element against the cooling element so as to transfer heat.

7. The inverter according to claim 1, further comprising:

an electrically insulating spacer, wherein the spacer receives the at least one capacitor of the capacitor board at least in some regions, and arranges the at least one capacitor in the cooling element spaced apart from the cooling element and in an electrically insulating manner, and a heat-conducting curing casting compound is arranged between the cooling element and the at least one capacitor of the capacitor board.

8. The inverter according to claim 1, further comprising:

an electrically insulating carrier, and wherein the capacitor board is arranged at the carrier with the at least one transistor board, which is fastened to the capacitor board, and is firmly connected to the carrier.

9. The inverter according to claim 8, further comprising:

at least one positioning unit for the at least one transistor plate, wherein the at least one positioning unit contains at least one positioning projection and at least one positioning opening that axially engage in each other, and the at least one positioning projection is disposed on the carrier and the at least one positioning opening is disposed in at least one of the at least one transistor board and at least one contact plate that is arranged at least one of on the at least one transistor board and in at least one spring element arranged on the at least one transistor board.

10. The inverter according to claim 1, further comprising:

an EMI filter, wherein at a longitudinal end of the inverter that faces away from the electric motor, the EMI filter is fastened to the cooling element externally and so as to transfer heat, and the EMI filter is electrically contacted between the capacitor board and direct current battery terminals.

11. An electric motor, comprising:

an inverter, the inverter axially attached to the motor with a longitudinal end that faces the motor, the motor electrically contacted with the inverter via at least one phase terminal that extends axially to the inverter, the inverter including:

a capacitor board including at least one capacitor, at least one transistor board, and a cooling element, the capacitor board and the at least one transistor board being electrically interconnected, the capacitor board and the at least one transistor board each aligned transversely to a longitudinal central axis of the inverter, wherein the cooling element is pot-shaped and provides a housing of the inverter that receives the capacitor board and the at least one transistor board;

wherein the at least one transistor board is pressed against a pot bottom of the pot-shaped cooling element from an inside so as to transfer heat, the pot base being surrounded by a circumferential wall of the pot-shaped cooling element.

12. The electric motor according to claim 11, wherein:

the pot bottom is aligned transversely to the longitudinal central axis, and the circumferential wall extends from a perimeter of the pot bottom and parallel to the longitudinal central axis, and a passage opening for contact lines of the inverter is provided centrally in the pot bottom.

13. The electric motor according to claim 12, wherein:

the cooling element has at least one cooling duct, through which a cooling liquid can flow, and the at least one cooling duct is disposed in the pot bottom so as to surround the passage opening.

14. The electric motor according to claim 11, wherein:

the pot-shaped cooling element has a die cast pot element and a cover plate aligned transversely to the longitudinal central axis, at least one cooling duct that is open on one side and aligned transversely to the longitudinal central axis, is disposed in the pot element on an outer side, and the cover plate axially and sealingly closes the at least one cooling duct, the cover plate being disposed in the pot element and open on one side, and is material bonded to the pot element.

15. The electric motor according to claim 11, wherein at least one of:

the at least one transistor board is annular and arranged so as to surround the longitudinal central axis, the at least one transistor board includes at least two transistor boards that are arranged so as to surround and so as to be distributed evenly around the longitudinal central axis, and the at least one transistor board is pressed against the cooling element from an inside so as to transfer heat.

16. The electric motor according to claim 11, further comprising a spring element and an electrically conductive contact plate provided for the at least one transistor board, wherein the spring element is arranged axially between the contact plate and the at least one transistor board, and resiliently connects the at least one transistor board and the contact plate to one another, and in response to an axial pressing force on the contact plate, the at least one transistor board is pressed via the spring element against the cooling element so as to transfer heat.

17. The electric motor according to claim 11, further comprising an electrically insulating spacer, wherein the spacer receives the at least one capacitor of the capacitor board at least in some regions, and arranges the at least one capacitor in the cooling element spaced apart from the cooling element and in an electrically insulating manner, and a heat-conducting curing casting compound is arranged between the cooling element and the at least one capacitor of the capacitor board.

18. The electric motor according to claim 11, further comprising an electrically insulating carrier;

wherein the capacitor board is arranged at the carrier with the at least one transistor board, which is fastened to the capacitor board, and is firmly connected to the carrier.

19. The electric motor according to claim 18, further comprising at least one positioning unit for the at least one transistor plate, the at least one positioning unit including at least one positioning projection and at least one positioning opening that axially engage in each other, wherein the at least one positioning projection is disposed on the carrier and the at least one positioning opening is disposed in at least one of the at least one transistor board and at least one contact plate that is arranged at least one of on the at least one transistor board and in at least one spring element arranged on the at least one transistor board.

20. The electric motor according to claim 11, further comprising an EMI filter, wherein at the longitudinal end of the inverter, the EMI filter is secured to the cooling element externally and so as to transfer heat, and wherein the EMI filter is electrically contacted between the capacitor board and direct current battery terminals of the inverter.

* * * * *